United States Patent
Fuerst et al.

(10) Patent No.: US 7,641,392 B2
(45) Date of Patent: Jan. 5, 2010

(54) HYDRODYNAMIC PLAIN BEARING

(75) Inventors: Axel Guenter Albert Fuerst, Ruefenach (CH); Kamil Matyscak, Uehlingen-Birkendorf (DE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 12/235,717

(22) Filed: Sep. 23, 2008

(65) Prior Publication Data
US 2009/0034891 A1    Feb. 5, 2009

Related U.S. Application Data

(63) Continuation of application No. PCT/EP2007/051741, filed on Feb. 23, 2007.

(30) Foreign Application Priority Data
Mar. 28, 2006   (CH)   ..................... 06/0493

(51) Int. Cl.
*F16C 32/06* (2006.01)
(52) U.S. Cl. ..................... 384/121; 384/307
(58) Field of Classification Search ......... 384/121–124, 384/303–308, 368–371, 420
See application file for complete search history.

(56) References Cited

U.S. PATENT DOCUMENTS

| | | | |
|---|---|---|---|
| 2,168,343 A | * | 8/1939 | Howarth ...................... 384/368 |
| 2,168,345 A | * | 8/1939 | Kingsbury ................... 384/368 |
| 4,077,682 A | | 3/1978 | Gardner et al. |
| 4,455,098 A | | 6/1984 | Pollik |
| 4,573,810 A | | 3/1986 | Fust et al. |
| 4,764,034 A | | 8/1988 | Fust et al. |
| 5,879,085 A | * | 3/1999 | Ball et al. ................... 384/307 |
| 2003/0081867 A1 | | 5/2003 | Weissbacher |

FOREIGN PATENT DOCUMENTS

| | | |
|---|---|---|
| DE | 1400438 B | 5/1970 |
| EP | 0077751 A | 4/1983 |
| EP | 0135730 A2 | 4/1985 |
| EP | 0272442 A2 | 6/1988 |
| GB | 720816 A | 12/1954 |

* cited by examiner

*Primary Examiner*—Thomas R Hannon
(74) *Attorney, Agent, or Firm*—Volpe and Koenig, P.C.

(57) ABSTRACT

A hydrodynamic plain bearing is provided and includes a raceway which is rotatable about an axis of rotation and which is mounted in the axial direction on a plurality of carrying segments (12). A lubricating oil film is formed between the raceway and the carrying segments (12) in a bearing gap. In such a plain bearing, a circulation of the lubricating oil is brought about in a simple way in that the plain bearing is equipped with an integrated pumping device (15) for pumping the lubricating oil around in a circuit.

11 Claims, 2 Drawing Sheets

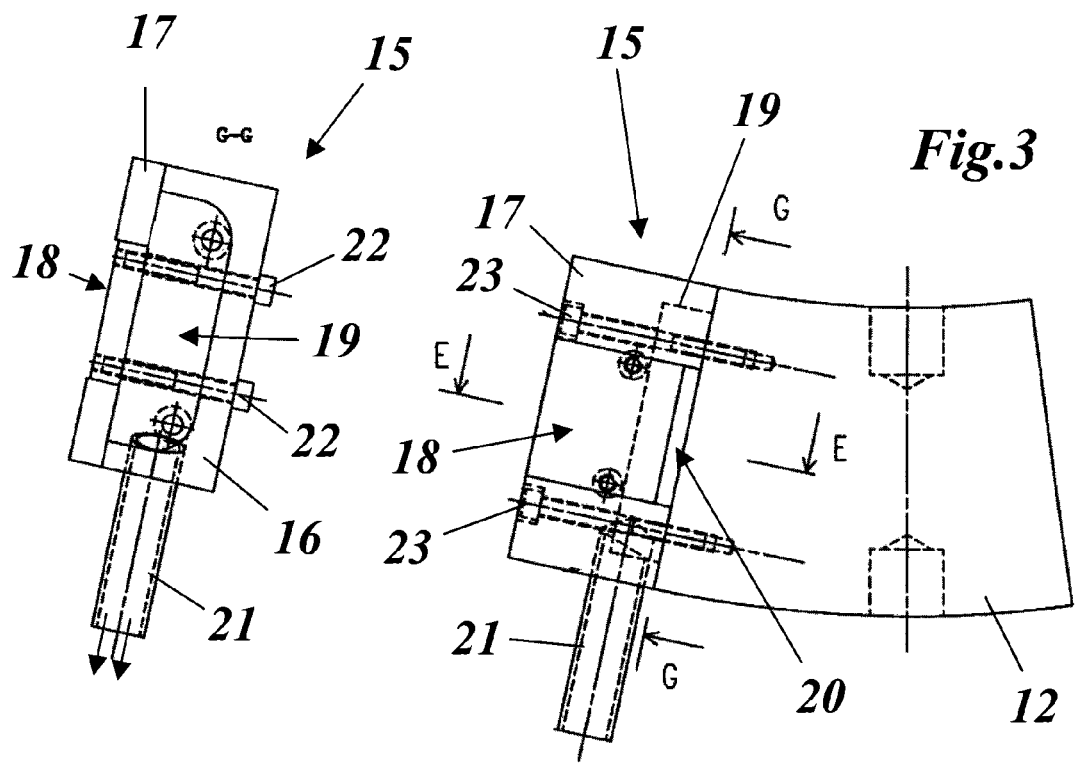
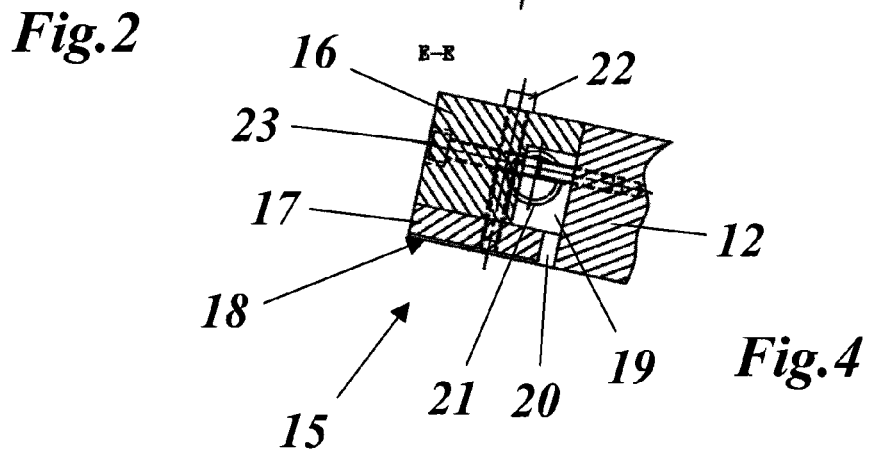

HYDRODYNAMIC PLAIN BEARING

CROSS REFERENCE TO RELATED APPLICATIONS

This application is a continuation of International Application No. PCT/EP2007/051741 filed Feb. 23, 2007, which claims priority to Swiss Application No. 00493/06 filed Mar. 28, 2006, the contents of which are incorporated by reference as if fully set forth.

FIELD OF INVENTION

The present invention relates to the field of the mounting of rotating machines, such as, for example, hydrogenerators.

BACKGROUND

Rotors of large machines, such as, for example, hydrogenerators are usually carried and guided by hydrodynamic plain bearings, as is described, for example, in the publication EP-A2-0 135 730. In these bearings, the axial and radial guidance is assumed by separate bearings of different form of construction. In EP-A2-0 135 730, for this purpose, a raceway (2) is provided in FIG. 1, which is mounted in the radial direction by means of guide bearing segments (4) and in the axial direction by means of carrying bearing segments (3). According to FIG. 2 of EP-A2-0 135 730, the guide bearing segments (4) are equipped with a pumping pocket or a pumping gap (13). The lubricant collects in the pumping gap (13) and is pumped from there through a lubricant outflow duct (14) into an outflow bore (15) and passes from there into a lubricant circuit.

Normally, the axial and the radial bearing are required at the same location (see EP-A2-0 135 730). Sometimes, however, only the axial carrying bearing is required. In that case, an external pump or straightforward pumping segments without a radial guide function have to be used as an oil or lubricant pump.

SUMMARY

The present invention relates to a hydrodynamic plain bearing. The plain bearing includes a raceway which is rotatable about an axis of rotation and which is mounted in the axial direction on the plurality of carrying segments. A lubricating oil film is formed between the raceway and the carrying segments in a bearing gap. The plain bearing is also equipped with an integrated pumping device for pumping the lubricating oil around in a circuit.

BRIEF DESCRIPTION OF THE DRAWINGS

The invention will be explained in more detail below by exemplary embodiments in conjunction with the drawing in which:

FIG. 2 shows a side view of a pumping device according to a preferred exemplary embodiment of the invention in the plane G-G in FIG. 3;

FIG. 3 shows a top view of a carrying segment with a screwed-on pumping device according to FIG. 2; and FIG. 4 shows a section through the arrangement from FIG. 3 in the plane E-E.

DETAILED DESCRIPTION OF THE PREFERRED EMBODIMENTS

Introduction to the Embodiments

Figure 1:
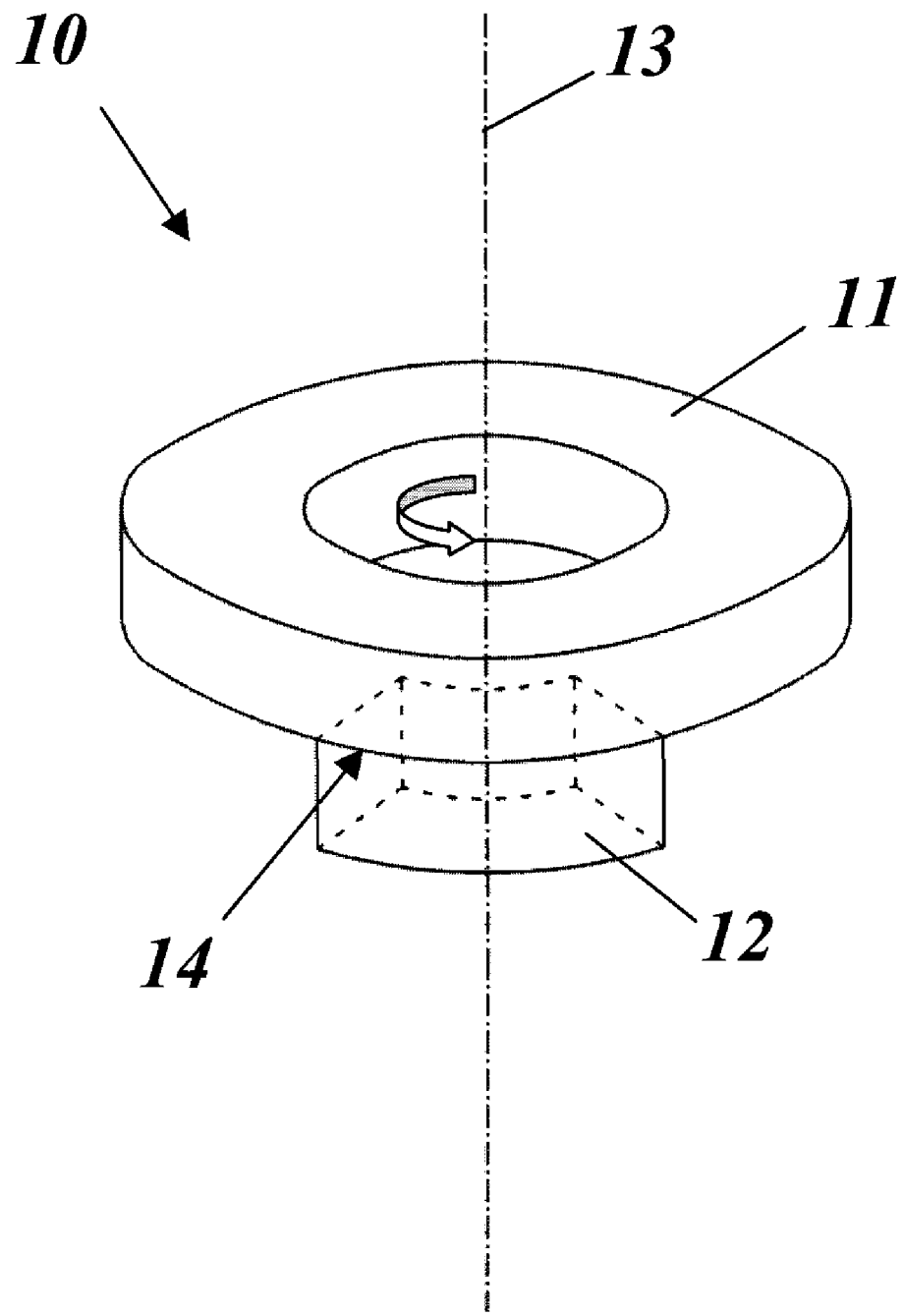
FIG. 1 shows a perspective view of the basic arrangement of a hydrodynamic plain bearing, such as is suitable for implementing the solution according to the invention.

The invention is distinguished in that the plain bearing is equipped with an integrated pumping device for pumping the lubricant around in a circuit.

According to a refinement of the invention, the pumping device is arranged laterally on one of the carrying segments, in particular the pumping device being arranged on the front side of the carrying element in the direction of rotation.

The pumping device is preferably designed separately from the carrying element and fastened releasably to the carrying segment.

Another refinement of the invention is that the pumping device is adjacent to the raceway perpendicularly to the axis of rotation and forms at the boundary between the top side and the raceway a pumping gap, and includes a discharging device for discharging the pressurized lubricating oil which collects in the pumping gap out of the pumping device laterally.

Preferably, the discharging device for discharging the lubricating oil comprises a discharge duct which is arranged at the end of the pumping gap in the direction of rotation and extends in the radial direction, in particular over the width of the pumping gap, and which is connected to a collection space arranged inside the pumping device, a discharge tube being led outward from the collection space in the radial direction out of the pumping device.

It is particularly advantageous for set-up and assembly if the pumping device comprises a basic body which can be fastened to the carrying segment and on the top side of which is attached a cover plate which is adjacent to the raceway and on the top side of which a depression is introduced in order to form the pumping gap. The cover plate is preferably releasably connected, in particular screwed, to the basic body.

The entire pumping device may also be a fixed integral part of the carrying segment without individual parts which are screwed in. The ducts may be milled out in the segment body.

According to a development of the invention, in the basic body, a first recess is provided at the end adjacent to the carrying segment and, after being covered by the cover plate, forms the collection space; a second recess which forms the discharge duct is provided at that end of the cover plate which is adjacent to the carrying segment.

DETAILED DESCRIPTION

The invention proceeds from a carrying bearing arrangement, such as is illustrated, greatly simplified, in FIG. 1. The plain bearing 10 of FIG. 1 comprises a raceway 11 which is rotatable about an axis of rotation 13 and which rests in the axial direction on a plurality of ring segment-shaped carrying segments 12, only one of which is depicted in FIG. 1. Between the underside of the raceway 11 and the top side of the carrying segment 12 is located a bearing gap 14 which is filled with a lubricant film. The direction of rotation adopted by the raceway 11 is indicated by the rotation arrow depicted in FIG. 1.

In order to set up a space-saving independent pumping system for the lubricant in a simple way for the axial plain bearing 10 in order to ensure circulation even for an extreme circuit without any further drive, according to FIGS. 3 and 4 a pumping device 15 is built laterally on that end of the carrying segment 12 which is at the front in the direction of rotation and cooperates with the raceway 11 and, when the raceway 11 rotates, generates a pumping action, such as was described similarly for the guide bearing segment in EP-A2-0 135 730 mentioned initially.

The pumping device 15 comprises a parallelepipedal basic body 16 which can be fastened to the carrying segment 12 and on the top side of which is attached a cover plate 17 adjacent to the raceway 11. Introduced into the top side of the cover plate 17 is a laterally delimited depression which extends in the direction of rotation and which, if the cover plate 17 is adjacent to the underside of the raceway 11, forms a desired pumping gap 18. The cover plate 17 is releasably connected to the basic body 16, in particular is screwed by the fastening screws 22.

A first recess is provided in the basic body 16 at the end adjacent to the carrying segment 12 and, after being covered by the cover plate 17, forms a collection space 19 which is delimited on one side by the carrying segment 12. At that end of the cover plate 17 which is adjacent to the carrying segment 12, a second recess is provided, which forms a discharge duct 20 delimited on one side by the carrying segment 12. The basic body 16 and consequently the entire pumping device 15 are screwed to the carrying segment 12 by two fastening screws 23.

When the raceway 11 rotates, lubricating oil collects in the pumping gap 18 and is discharged continuously, through the discharge duct 20 arranged at the end of the pumping gap 18, into the collection space 19 lying inside the pumping device 15. A discharge tube 21 projects into the collection space 19 and is led outward in the radial direction through the basic body 16. The pumped lubricating oil can be delivered through the discharge tube 21 for cooling and/or filtration and can subsequently be recirculated into the bearing region so as to form a closed circuit.

By the combination of the carrying segment 12 and of the pumping device 15 flanged to it, there is no need for an external pump or special pumping segments can be dispensed with. The pumping device 15 can easily be retrofitted on already existing carrying segments. By the pumping device 15 being divided into the basic body 16 and cover plate 17, production is simplified. Overall, the following advantages are afforded:

short type of construction;
fewer bearing parts overall;
no external pumps necessary; and
higher operating reliability.

LIST OF REFERENCE SYMBOLS

10 Plain bearing (hydrodynamic)
11 Raceway
12 Carrying segment
13 Axis of rotation
14 Bearing gap
15 Pumping device
16 Basic body
17 Cover plate
18 Pumping gap
19 Collection space
20 Discharge duct
21 Discharge tube
22, 23 Fastening screw

What is claimed is:

1. A hydrodynamic plain bearing (10), comprising a raceway (11) which is rotatable about an axis of rotation (13) and which is mounted in an axial direction on the plurality of carrying segments (12), a lubricating oil film being formed between the raceway (11) and the carrying segments (12) in a bearing gap (14), the plain bearing (10) being equipped with an integrated pumping device (15) for pumping the lubricating oil around in a circuit, wherein the pumping device (15) is arranged on the front side of the carrying segment (12) in the direction of rotation and is designed separately from the carrying segment (12) and fastened releasably to the carrying segment (12).

2. The plain bearing as claimed in claim 1, wherein the pumping device (15) is adjacent with the top side to the raceway (11) and forms a pumping gap (18) at the boundary between the top side and the raceway (11), and a discharging device is provided (19, 20, 21) in order to discharge the pressurized lubricating oil which collects in the pumping gap (18) laterally out of the pumping device (15).

3. The plain bearing as claimed in claim 2, wherein the discharging device for discharging the lubricating oil comprises a discharge duct (20) which is arranged at the end of the pumping gap (18) in the direction of rotation and extends in the radial direction, over the width of the pumping gap (18), and which is connected to a collection space (19) arranged inside the pumping device (15), and in that a discharge tube is led outward from the collection space (19) in the radial direction out of the pumping device (15).

4. The plain bearing as claimed in claim 3, wherein the pumping device (15) comprises a basic body (16) which can be fastened to the carrying segment (12) and on the top side of which is attached a cover plate (17) which is adjacent to the raceway (11) and in the top side of which a depression is introduced in order to form the pumping gap (18).

5. The plain bearing as claimed in claim 4, wherein, in the basic body (16), a first recess (19) is provided at the end adjacent to the carrying segment (12) and, after being covered by the cover plate (17) forms the collection space (19), and in that a second recess (20) which forms the discharge duct (20) is provided at that end of the cover plate (17) which is adjacent to the carrying segment (12).

6. The plain bearing as claimed in claim 4, wherein the cover plate (17) is releasably connected to the basic body (16).

7. The plain bearing as claimed in claim 6, wherein, in the basic body (16), a first recess (19) is provided at the end adjacent to the carrying segment (12) and, after being covered by the cover plate (17) forms the collection space (19), and in that a second recess (20) which forms the discharge duct (20) is provided at that end of the cover plate (17) which is adjacent to the carrying segment (12).

8. A hydrodynamic plain bearing (10), comprising a raceway (11) which is rotatable about an axis of rotation (13) and which is mounted in an axial direction on the plurality of carrying segments (12), a lubricating oil film being formed between the raceway (11) and the carrying segments (12) in a bearing gap (14), the plain bearing (10) being equipped with an integrated pumping device (15) for pumping the lubricating oil around in a circuit, wherein the pumping device (15) is adjacent with the top side to the raceway (11) and forms a pumping gap (18) at the boundary between the top side and the raceway (11), and a discharging device is provided (19, 20, 21) in order to discharge the pressurized lubricating oil which collects in the pumping gap (18) laterally out of the pumping device (15), wherein the discharging device for discharging the lubricating oil comprises a discharge duct (20) which is arranged at the end of the pumping gap (18) in the direction of rotation and extends in the radial direction over the width of the pumping gap (18), and which is connected to a collection space (19) arranged inside the pumping device (15), wherein a discharge tube is led outward from the collection space (19) in the radial direction out of the pumping device (15), and wherein the pumping device (15) comprises a basic body (16) which can be fastened to the carrying segment (12) and on the top side of which is attached a cover plate (17) which is adjacent to the raceway (11) and in the top side of which a depression is introduced in order to form the pumping gap (18).

9. The plain bearing as claimed in claim 8, wherein, in the basic body (16), a first recess (19) is provided at the end adjacent to the carrying segment (12) and, after being covered by the cover plate (17) forms the collection space (19), and in that a second recess (20) which forms the discharge duct (20) is provided at that end of the cover plate (17) which is adjacent to the carrying segment (12).

10. The plain bearing as claimed in claim 8, wherein the cover plate (17) is releasably connected to the basic body (16).

11. The plain bearing as claimed in claim 10, wherein, in the basic body (16), a first recess (19) is provided at the end adjacent to the carrying segment (12) and, after being covered by the cover plate (17) forms the collection space (19), and in that a second recess (20) which forms the discharge duct (20) is provided at that end of the cover plate (17) which is adjacent to the carrying segment (12).

\* \* \* \* \*